US012571270B2

(12) United States Patent
Martinez et al.

(10) Patent No.: US 12,571,270 B2

(45) Date of Patent: Mar. 10, 2026

(54) SHEAR INDUCER, SYSTEM, AND METHOD

(71) Applicant: Baker Hughes Oilfield Operations LLC, Houston, TX (US)

(72) Inventors: José Martinez, Spring, TX (US); Eliah Everhard, The Woodlands, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 614 days.

(21) Appl. No.: 18/070,932

(22) Filed: Nov. 29, 2022

(65) Prior Publication Data

US 2024/0175327 A1 May 30, 2024

(51) Int. Cl.

*E21B 21/00* (2006.01)
*B01F 25/27* (2022.01)
*E21B 21/06* (2006.01)
*B01F 101/49* (2022.01)

(52) U.S. Cl.

CPC ............ *E21B 21/062* (2013.01); *B01F 25/27* (2022.01); *B01F 2101/49* (2022.01)

(58) Field of Classification Search

CPC .. E21B 21/1062; B01F 25/27; B01F 2101/49; B01F 25/20

See application file for complete search history.

(56) References Cited

U.S. PATENT DOCUMENTS

| | | | | |
|---|---|---|---|---|
| 4,470,727 | A | 9/1984 | Ritter | |
| 5,052,486 | A | 10/1991 | Wilson | |
| 5,802,011 | A | 9/1998 | Winters et al. | |
| 6,305,835 | B1 * | 10/2001 | Farrar | B01F 25/27 366/162.4 |
| 9,476,270 | B2 | 10/2016 | Istre et al. | |
| 2003/0130135 | A1 | 7/2003 | Hou et al. | |
| 2005/0051323 | A1 | 3/2005 | Fripp et al. | |
| 2016/0230119 | A1 * | 8/2016 | Goto | C10M 129/70 |

OTHER PUBLICATIONS

International Search Report and Written Opinion; PCT/US2023/037225; Korean Intellectual Property Office; Mailed Mar. 8, 2024; 10 pages.

* cited by examiner

*Primary Examiner* — Anshu Bhatia

(74) *Attorney, Agent, or Firm* — Baker Hughes Company

(57) ABSTRACT

A fluid shear inducer includes a housing defining a primary flow path, a secondary flow path branching from the primary flow path, a return junction connecting the secondary flow path back to the primary flow path, and a fluid accelerator associated with the secondary flow path. A method for shearing fluid includes flowing a fluid into a housing defining a primary flow path and a secondary flow path, branching some of the flowing fluid from the primary flow path into the secondary flow path, accelerating the fluid in the secondary flow path, and impinging the accelerated fluid from the secondary flow path into the fluid in the primary flow path. A fluid system includes a fluid reservoir, a pump operably connected to the reservoir, and a fluid shear inducer fluidly connected to the pump.

19 Claims, 5 Drawing Sheets

SHEAR INDUCER, SYSTEM, AND METHOD

BACKGROUND

In the resource recovery industry drilling fluids are often prepared at a factory location and transported to a rig site. Many fluids for use downhole include weighting components that tend to settle during transport. This is undesirable. It is very important to have solids suspended in the fluid rather than precipitated out and sitting on the bottom of the container. In order to resuspend the solids, shearing forces are useful. Typically, the art uses flow through an orifice to create turbulence in an attempt to resuspend the solids content. While this has some effect, efficiency is lacking. The art would appreciate arrangements that improve efficiency.

SUMMARY

An embodiment of a fluid shear inducer includes a housing defining a primary flow path, a secondary flow path branching from the primary flow path, a return junction connecting the secondary flow path back to the primary flow path, and a fluid accelerator associated with the secondary flow path.

An embodiment of a method for shearing fluid includes flowing a fluid into a housing defining a primary flow path and a secondary flow path, branching some of the flowing fluid from the primary flow path into the secondary flow path, accelerating the fluid in the secondary flow path, and impinging the accelerated fluid from the secondary flow path into the fluid in the primary flow path.

An embodiment of a fluid system includes a fluid reservoir, a pump operably connected to the reservoir, and a fluid shear inducer fluidly connected to the pump.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
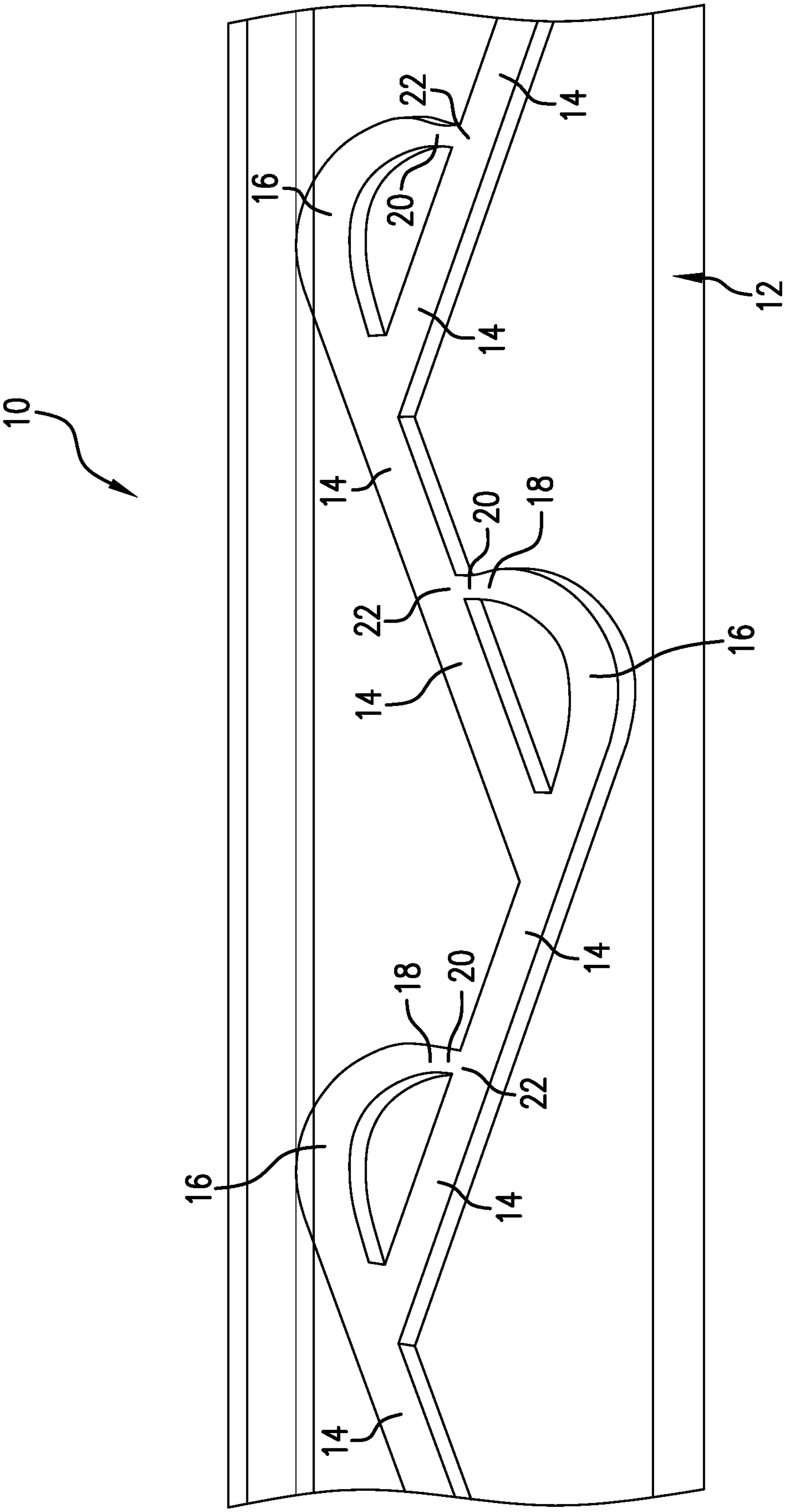
FIG. 1 is a schematic view of a fluid shear inducer as disclosed herein.
Figure 2:
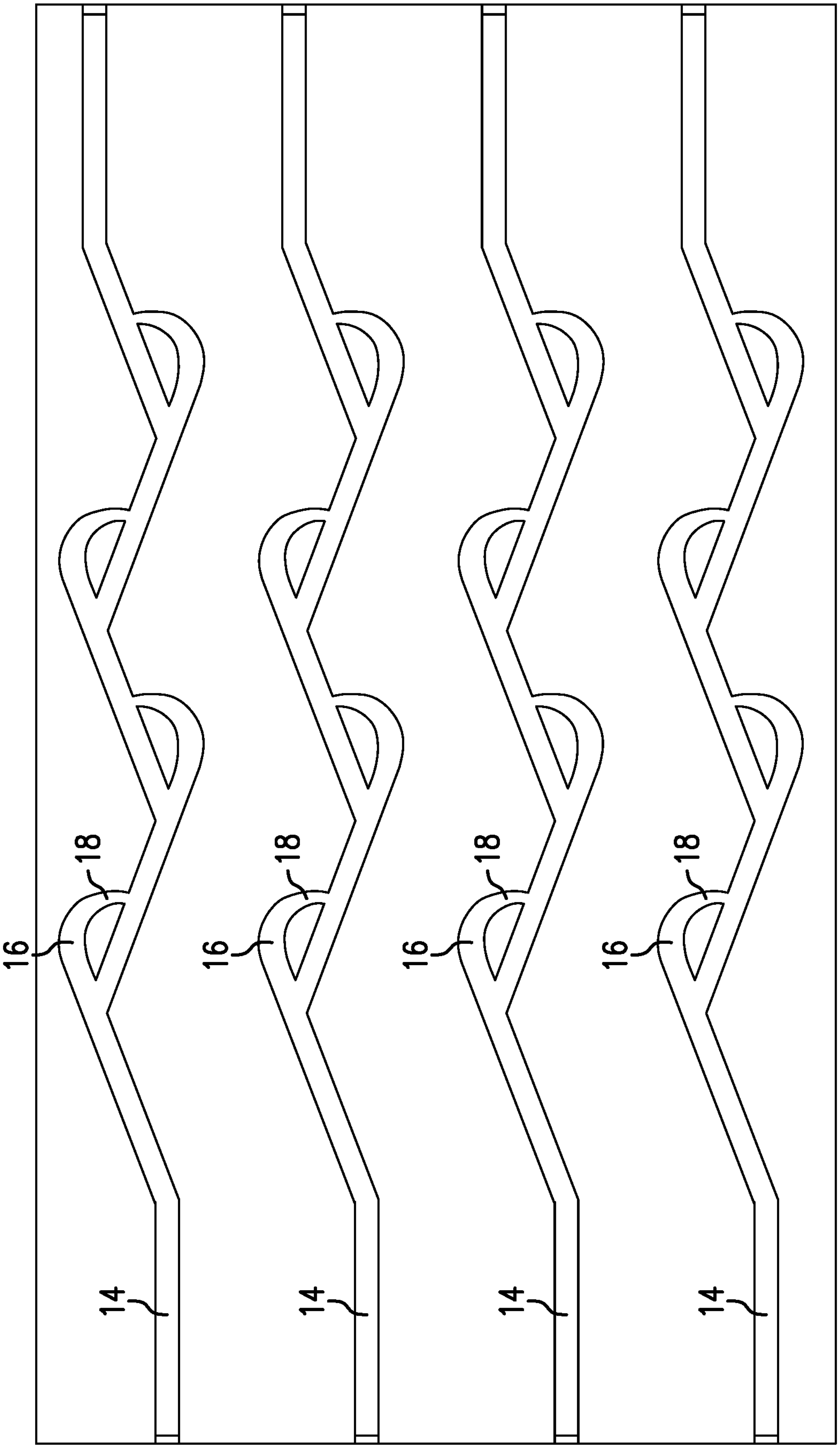
FIG. 2 is a view similar to FIG. 1 with multiple pathways illustrated.
Figure 3:
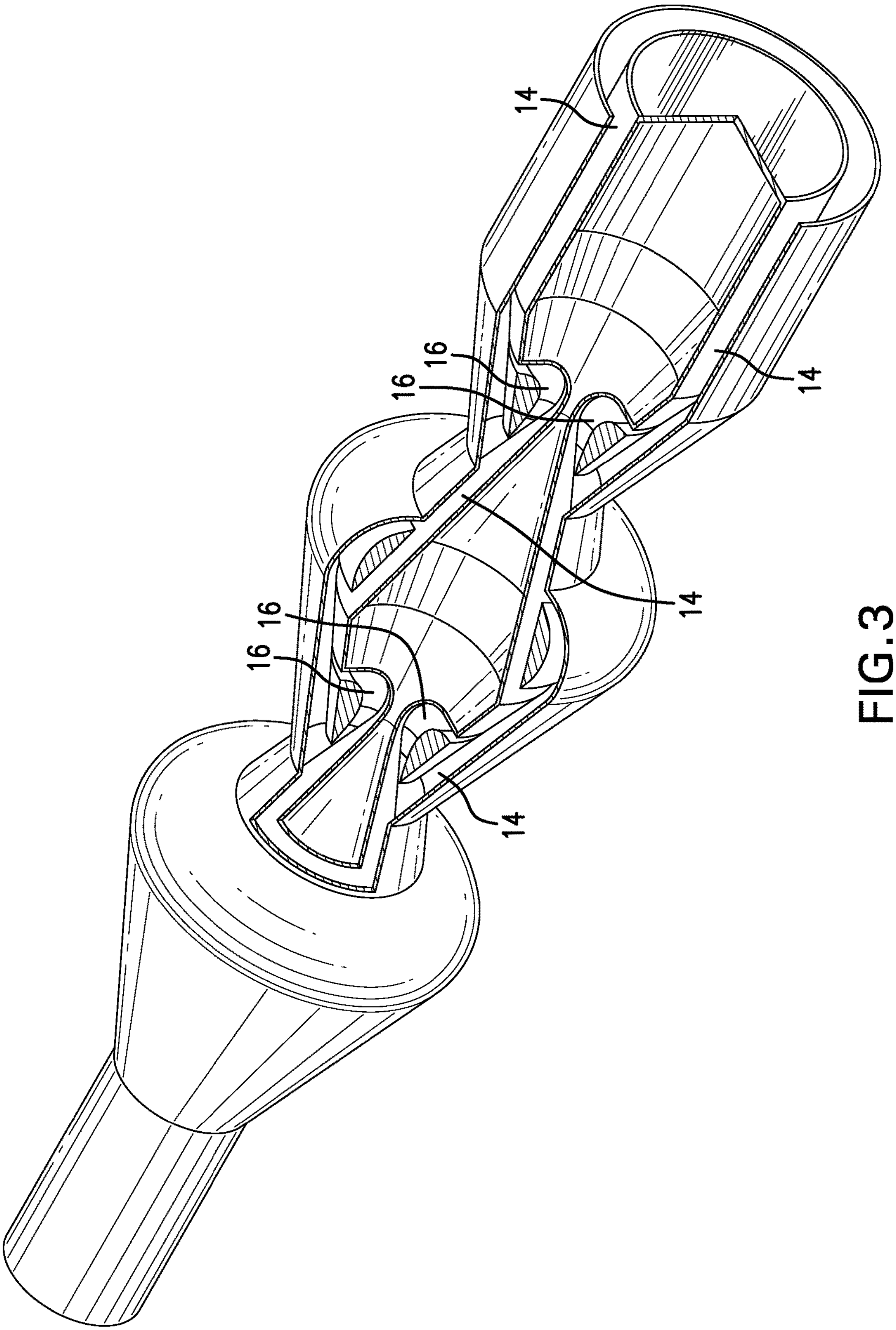
FIG. 3 is another embodiment of the fluid shear inducer where the flow paths are annular.

Referring to FIG. 1, a fluid shear inducer 10 is illustrated. The inducer 10 comprises a housing 12 that may be a solid material or may be a tubular material with the inducer in a wall thickness thereof. Within the housing 12 is defined a primary flow path 14 and a secondary flow path 16. While in the FIG. 1 representation, the primary and secondary flow paths are illustrated as one singular flow structure, it is to be understood that a plurality or multiplicity of primary and secondary pathway structures is also contemplated. For example, tens or even hundreds of these pathways may be included in a single inducer 10 (see FIG. 2). The cross-sectional area of the path 14 is substantially the same over all of its length. Part of the path 16 is substantially the same cross-sectional area as that of the path 14 however some of the path 16 is configured to accelerate fluid flowing therein with an accelerator 18. In an embodiment the accelerator 18 is a nozzle that is either created in the secondary path 16 by smoothly reducing the dimension(s) (e.g. diminishing circular or pyramidic dimensions) of the path 16 or by inserting a nozzle in the path 16. As will be recognized, a nozzle and laminar flow will, according to the Bernoulli principle, increase the velocity of the fluid flowing therein. While it will also decrease pressure and temperature in that fluid, the more important effect for inducer 10 is the velocity increase. An orifice could also be used or a pump can be used to accelerate fluid in path 16. Regardless of the characterization of the accelerator 18, an outlet 20 of the accelerator 18 is located at a return junction 22, where fluid flowing in secondary flow path 16 is reintroduced to the primary flow path 14. At junction 22, the higher velocity fluid exiting the outlet 20 impinges or jets into the primary fluid flow path 14 and will cause significant turbulence in fluid flowing in the path 14. This creates substantial shear in the fluid and ensures that solids remain suspended in the fluid. Since it is undesirable to create a pressure drop across the inducer 10, the angle at which the fluid flowing in path 16 is reintroduced to the path 14 is in direction that is not against the direction of flow path 14. In embodiments, a range of angles for reintroduction of fluid from the secondary fluid path 16 includes 90 degrees and less, with the acute angle represented by less than 90 degrees facing in the upstream direction relative to the primary flow path 14. With these angle options, there is no reintroduction of flow in an opposing direction to that of the primary flow path 14 and hence very little effect, if any, on pressure drop across the inducer 10. In embodiments, the paths 14 and 16 may be as illustrated in FIG. 1 but also may be configured in an annular form as illustrated in FIG. 3.

Figure 4:
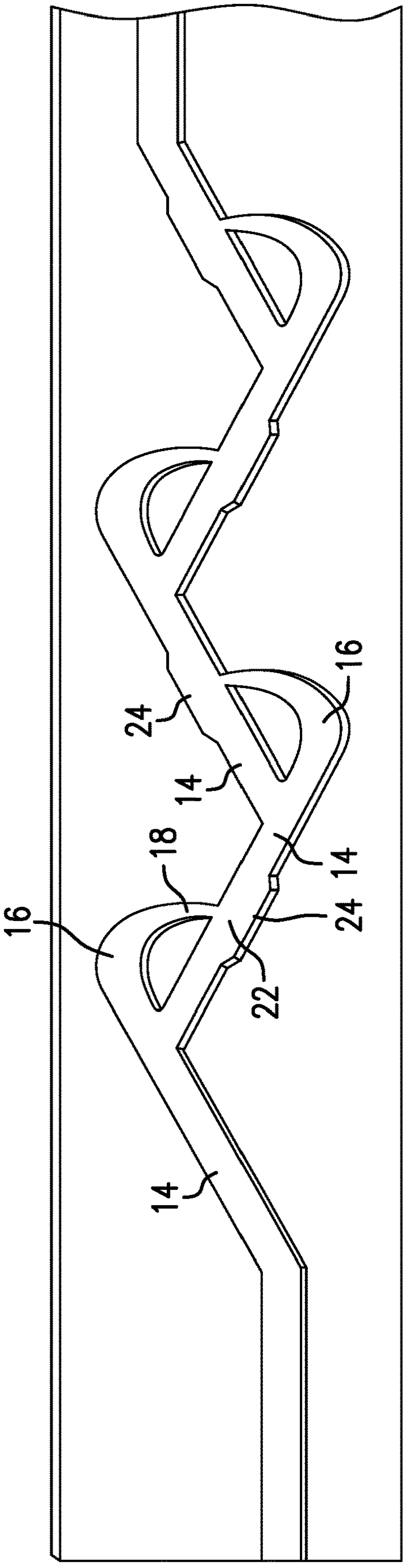
FIG. 4 is also a view similar to FIG. 1 but including a velocity reducer.

Referring to FIG. 4, another embodiment of inducer 10 includes an additional feature of primary flow path 14. As illustrated, a velocity reducer 24 is disposed within path 14. Reducer 24 enlarges the flow path 14 so that fluid flowing therein will slow to a reduced velocity. Reducer 24 is positioned such that the reducer bridges the return junction 22. This means that fluid flow velocity within primary path 14 will be slower where the junction 22 accepts higher velocity fluid flow from accelerator 18 into the junction 22. A greater mismatch in fluid velocities may increase the shear effect induced in the flows thereby improving homogeneity. It is to be appreciated that the reducer 24 may be made a part of any of the embodiments disclosed herein with identical effect. It is also to be appreciated that reducer 24 need now be positioned at every junction 22 but may also be provided only on select ones of the junctions 22.

In either of the above cases, the housing 12 may be configured with threads on either end, such as pipe threads or premium threads (box on one end and pin on the other end) so that the housing may be easily threaded in line with a fluid piping system such as one using drill pipe. Also, in embodiments, it may be desirable to increase a length over which the inducer 10 extends by stacking two or more of the housings 12 together. Each housing would have a number of secondary paths 16 and thereby further shear fluid flowing therein. The modularity created by the threads allows for great customization of a resulting fluid system.

A method for shearing fluid with the inducer 10 includes flowing a fluid into the housing 12 and into the primary flow path 14. When the fluid in the path 14 reaches a branch point with one or more secondary flow path(s) 16, the method includes branching some of the flowing fluid from the primary flow path 14 into the secondary flow path 16. The method further comprises accelerating the fluid flowing in the secondary flow path 16 and impinging the accelerated fluid from the secondary flow path into the fluid in the primary flow path. The velocity increased fluid impinges or jets into the primary fluid path 14 creating substantial turbulence and shear and therefore ensures suspended solids in the fluid.

Figure 5:
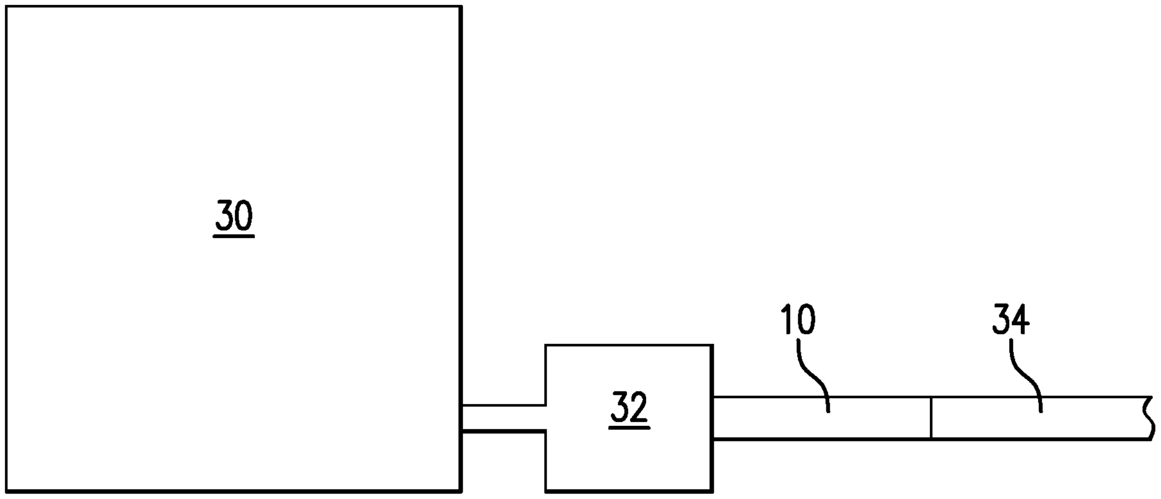
FIG. 5 is a fluid system including the fluid shear inducer as disclosed herein.

Referring to FIG. 5, a system that uses the inducer described above may include a fluid reservoir 30 that may be quite large, for example 1000 gallons. A pump 32 is fluidly connected to the reservoir so that fluid therein may be displaced to another location. The pump 32 is connected to one or more inducers 10 and the inducer(s) 10 may be connected to a string 34 leading to a target area for the fluid, perhaps in a borehole or another reservoir.

Set forth below are some embodiments of the foregoing disclosure:

Embodiment 1: A fluid shear inducer includes a housing defining a primary flow path, a secondary flow path branching from the primary flow path, a return junction connecting the secondary flow path back to the primary flow path, and a fluid accelerator associated with the secondary flow path.

Embodiment 2: A fluid shear inducer according to any prior embodiment, wherein the fluid accelerator is a narrowing of the secondary flow path along at least a part of its length.

Embodiment 3: A fluid shear inducer according to any prior embodiment, wherein the accelerator terminates at the return junction.

Embodiment 4: A fluid shear inducer according to any prior embodiment, wherein the accelerator is a nozzle.

Embodiment 5: A fluid shear inducer according to any prior embodiment, wherein the nozzle is installed in the housing.

Embodiment 6: A fluid shear inducer according to any prior embodiment, wherein the return junction joins the secondary flow path to the primary flow path at less than or equal to 90 degrees toward an upstream portion of the primary flow path.

Embodiment 7: A fluid shear inducer according to any prior embodiment, wherein the primary path includes a velocity reducer.

Embodiment 8: A fluid shear inducer according to any prior embodiment, wherein the primary and secondary flow paths are annular.

Embodiment 9: A fluid shear inducer according to any prior embodiment, wherein the secondary flow path is a plurality of secondary flow paths branching from the primary flow path.

Embodiment 10: A fluid shear inducer according to any prior embodiment, wherein the housing includes a connection configuration at each end of the primary flow path.

Embodiment 11: A fluid shear inducer according to any prior embodiment, wherein the connection configuration is a pipe thread.

Embodiment 12: A fluid shear inducer according to any prior embodiment, including a plurality of primary paths and secondary paths in the housing.

Embodiment 13: A method for shearing fluid includes flowing a fluid into a housing defining a primary flow path and a secondary flow path, branching some of the flowing fluid from the primary flow path into the secondary flow path, accelerating the fluid in the secondary flow path, and impinging the accelerated fluid from the secondary flow path into the fluid in the primary flow path.

Embodiment 14: The method as in any prior embodiment, wherein the impinging occurs in a downstream direction of the primary flow path.

Embodiment 15: The method as in any prior embodiment, wherein the impinging occurs at 90 degrees to the primary flow path.

Embodiment 16: The method as in any prior embodiment, wherein the accelerating is through a nozzle.

Embodiment 17: The method as in any prior embodiment, wherein the secondary flow path is a plurality of secondary flow paths and the branching of the fluid is from the primary flow path to each of the plurality of secondary flow paths.

Embodiment 18: The method as in any prior embodiment, wherein the housing is a plurality of housings connected together and the flowing occurs seriatim through each of the plurality of housings.

Embodiment 19: A fluid system includes a fluid reservoir, a pump operably connected to the reservoir, and a fluid shear inducer as claimed in any prior embodiment, fluidly connected to the pump.

Embodiment 20: The fluid system according to any prior embodiment, wherein the inducer is a plurality of inducers fluidly connected together in series.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" includes a range of ±8% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A fluid shear inducer comprising a housing defining:
a primary flow path;
a secondary flow path branching from the primary flow path;
a return junction connecting the secondary flow path back to the primary flow path;
a fluid accelerator forming part of the secondary flow path; and
a velocity reducer forming part of the primary flow path and bridging the return junction, the velocity reducer including an enlarged section of the primary flow path that extends across the return junction.

2. The inducer as claimed in claim 1, wherein the fluid accelerator is a narrowing of the secondary flow path along at least a part of its length.

3. The inducer as claimed in claim 2, wherein the accelerator terminates at the return junction.

4. The inducer as claimed in claim 1, wherein the accelerator is a nozzle.

5. The inducer as claimed in claim 4, wherein the nozzle is installed in the housing.

6. The inducer as claimed in claim 1, wherein the return junction joins the secondary flow path to the primary flow path at less than or equal to 90 degrees toward an upstream portion of the primary flow path.

7. The inducer as claimed in claim 1, wherein the primary and secondary flow paths are annular.

8. The inducer as claimed in claim 1, wherein the secondary flow path is a plurality of secondary flow paths branching from the primary flow path.

9. The inducer as claimed in claim 1, wherein the housing includes a threaded connection at each end of the primary flow path.

10. The inducer as claimed in claim 9, wherein the connection configuration is a pipe thread.

11. The inducer as claimed in claim 1, including a plurality of primary paths and secondary paths in the housing.

12. A fluid system comprising:
a fluid reservoir;
a pump operably connected to the reservoir; and
a fluid shear inducer as claimed in claim 1, fluidly connected to the pump.

13. The system as claimed in claim 12, wherein the inducer is a plurality of inducers fluidly connected together in series.

14. A method for shearing fluid comprising:
flowing a fluid into a housing defining a primary flow path and a secondary flow path;
branching some of the flowing fluid from the primary flow path into the secondary flow path;
accelerating the fluid in the secondary flow path; and
impinging the accelerated fluid from the secondary flow path into the fluid in the primary flow path; and
reducing a velocity of the fluid in the primary flow path by a velocity reducer forming part of the primary flow path and bridging the return junction, the velocity reducer including an enlarged section of the primary flow path that extends across the return junction.

15. The method as claimed in claim 14, wherein the impinging occurs in a downstream direction of the primary flow path.

16. The method as claimed in claim 14, wherein the impinging occurs at 90 degrees to the primary flow path.

17. The method as claimed in claim 14, wherein the accelerating is through a nozzle.

18. The method as claimed in claim 14, wherein the secondary flow path is a plurality of secondary flow paths and the branching of the fluid is from the primary flow path to each of the plurality of secondary flow paths.

19. The method as claimed in claim 14, wherein the housing is a plurality of housings connected together and the flowing occurs seriatim through each of the plurality of housings.

* * * * *